(12) United States Patent
Umezuki

(10) Patent No.: US 8,972,771 B2
(45) Date of Patent: Mar. 3, 2015

(54) CONNECTION CONTROL APPARATUS, STORAGE SYSTEM, AND CONTROL METHOD OF CONNECTION CONTROL APPARATUS

(75) Inventor: Takeshi Umezuki, Yokohama (JP)

(73) Assignee: Fujitsu Limited, Kawasaki (JP)

(*) Notice: Subject to any disclaimer, the term of this patent is extended or adjusted under 35 U.S.C. 154(b) by 232 days.

(21) Appl. No.: 13/611,370

(22) Filed: Sep. 12, 2012

(65) Prior Publication Data
US 2013/0111259 A1    May 2, 2013

(30) Foreign Application Priority Data

Nov. 2, 2011 (JP) ................................. 2011-241578

(51) Int. Cl.
*G06F 11/00* (2006.01)
*G06F 11/20* (2006.01)
*G06F 15/16* (2006.01)

(52) U.S. Cl.
CPC ............ *G06F 11/2033* (2013.01); *G06F 15/16* (2013.01); *G06F 11/2038* (2013.01); *G06F 11/2043* (2013.01)
USPC .......................................... 714/4.11; 714/13

(58) Field of Classification Search
USPC .................................. 714/4.11, 13
See application file for complete search history.

(56) References Cited

U.S. PATENT DOCUMENTS

| | | | | |
|---|---|---|---|---|
| 6,718,383 B1* | 4/2004 | Hebert | | 709/224 |
| 7,139,928 B1* | 11/2006 | Bhattacharya et al. | | 714/4.4 |
| 7,283,465 B2* | 10/2007 | Zelig et al. | | 370/219 |
| 7,441,141 B2* | 10/2008 | Poustchi et al. | | 714/4.11 |
| 7,505,401 B2* | 3/2009 | Kashyap | | 370/217 |
| 8,677,180 B2* | 3/2014 | Bayer et al. | | 714/13 |
| 2005/0240797 A1* | 10/2005 | Orava et al. | | 714/4 |
| 2008/0239946 A1* | 10/2008 | Morita | | 370/217 |
| 2008/0244098 A1 | 10/2008 | Oikawa et al. | | |
| 2011/0004782 A1* | 1/2011 | Massa et al. | | 714/4 |

FOREIGN PATENT DOCUMENTS

JP    5-75637    3/1993
JP    2008-242872    10/2008

* cited by examiner

*Primary Examiner* — Philip Guyton
(74) *Attorney, Agent, or Firm* — Staas & Halsey LLP

(57) ABSTRACT

A connection control apparatus includes an active control unit that performs routing of data to a first device connected to a port of the connection control apparatus by using an address of the first device, and a standby control unit that, when the active control unit causes a failure, performs routing of data to the first device by using the address of the first device and by using route information indicating a connection route to a second device connected to a port of an adjacent connection control apparatus connected to the connection control apparatus, the standby control unit performing routing of data to the second device by using the route information upon the adjacent connection control apparatus being unable to perform routing.

3 Claims, 13 Drawing Sheets

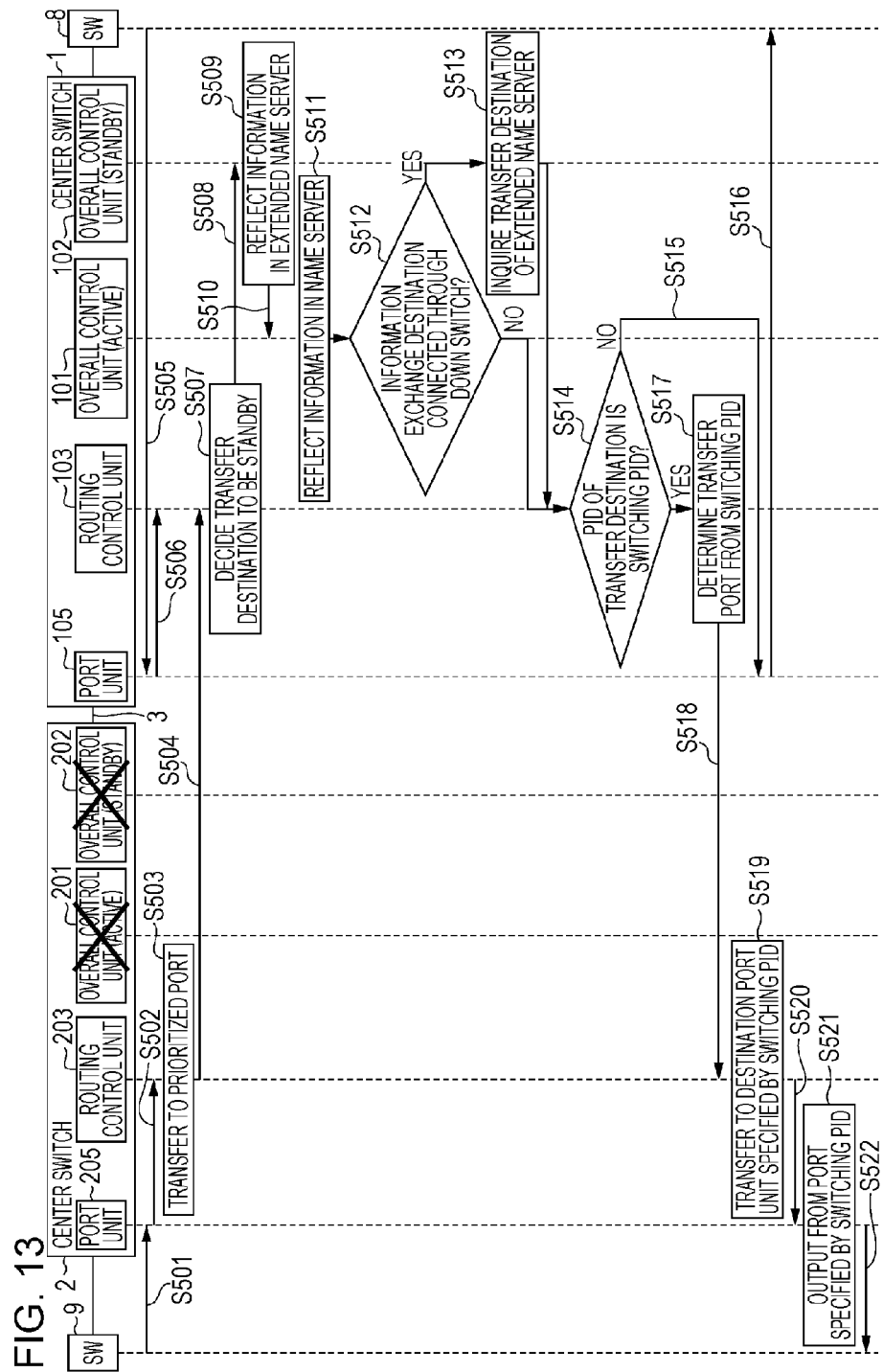

CONNECTION CONTROL APPARATUS, STORAGE SYSTEM, AND CONTROL METHOD OF CONNECTION CONTROL APPARATUS

CROSS-REFERENCE TO RELATED APPLICATION

This application is based upon and claims the benefit of priority of the prior Japanese Patent Application No. 2011-241578, filed on Nov. 2, 2011, the entire contents of which are incorporated herein by reference.

FIELD

The embodiments discussed herein are related to a connection control apparatus, a storage system, and a control method of the connection control apparatus.

BACKGROUND

In recent years, storage systems configured with a storage area network (SAN) architecture in which fiber channel switches are used are becoming mainstream. On a SAN, a plurality of severs, a plurality of storage units, and a plurality of other peripheral units are mutually connected through fiber channels. Storage integration, in which data in a plurality of severs is stored together, is carried out through a SAN.

With the SAN, a fiber channel switch called a center witch or director is used. The center switch has a function that is a kernel in data routing. Specifically, the center switch assigns port IDs (PIDs) to devices connected to it. The assigned PIDs are stored in a name server in the center switch. The center switch uses a PID stored in the name server to transfer data received from a device (a server, for example) to a specified device (a storage unit, for example). In addition, the center switch acquires data from a specified device and transfers the acquired data to a device that has requested the data. Since many devices are mutually connected in recent years, a SAN to which a plurality of center switches are connected is often used. From the viewpoint of the fiber switch, a switch that simply performs routing may be connected to a center switch of this type.

Some SANs use a redundant configuration to protect against communication failures. In a conventional technology, for example, a plurality of fiber channel switches are connected to a single device and data transmission routes are duplicated; in this configuration, after a switchover has been made, a state is monitored through broadcasting and a routing table is updated.

When a redundant configuration is used, a center switch with a redundant configuration may be used, that is, elements that implement the functions of the center switch described above are duplicated. In the description that follows, elements that perform routing in a normal state will be referred to as the active side and duplicated elements to which the center switch switches in case of a failure on the active side will be referred to as the standby side.

In the center switch with a redundant configuration, the active side and standby side each have a name server. Even if the name server in the active side goes down, the center switch switches to the standby side and may uses the name server on the standby side to enable routing as on the active side.

Japanese Laid-open Patent Publication No. 2008-242872 is an example of related art.

If, for example, failures occur on both the active side and standby side, device information stored in the name servers are deleted and address resolution is disabled. This suppresses the center switch, in which both the active side and standby side caused a failure, from carrying out routing. Accordingly, for example, the center switch may no longer route data to a device connected to the center switch.

Even if the conventional technology in which monitoring is performed through broadcasting after a switchover has been made is used, when a switch with a redundant configuration causes failures in the active side and standby side, it is suppressed to route data to devices connected to only the switch.

SUMMARY

According to an aspect of the embodiments, a connection control apparatus includes an active control unit that performs routing of data to a first device connected to a port of the connection control apparatus by using an address of the first device, and a standby control unit that, when the active control unit causes a failure, performs routing of data to the first device by using the address of the first device and by using route information indicating a connection route to a second device connected to a port of an adjacent connection control apparatus connected to the connection control apparatus, the standby control unit performing routing of data to the second device by using the route information upon the adjacent connection control apparatus being unable to perform routing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a sequence diagram of processing executed at a time when one center switch in the storage system in the second embodiment goes down.

DESCRIPTION OF EMBODIMENTS

Embodiments of a connection control apparatus, a storage system, and a control method of the connection control apparatus disclosed in this application will be described in detail with reference to the drawings. The connection control apparatus, storage system, and the method of the connection control apparatus are not limited by embodiments described below. Particularly, although a fiber channel will be used in the description below as an example of the connection control apparatus, this is not a limitation. The fiber channel will be referred to below as the FC switch.

First Embodiment

Figure 1:
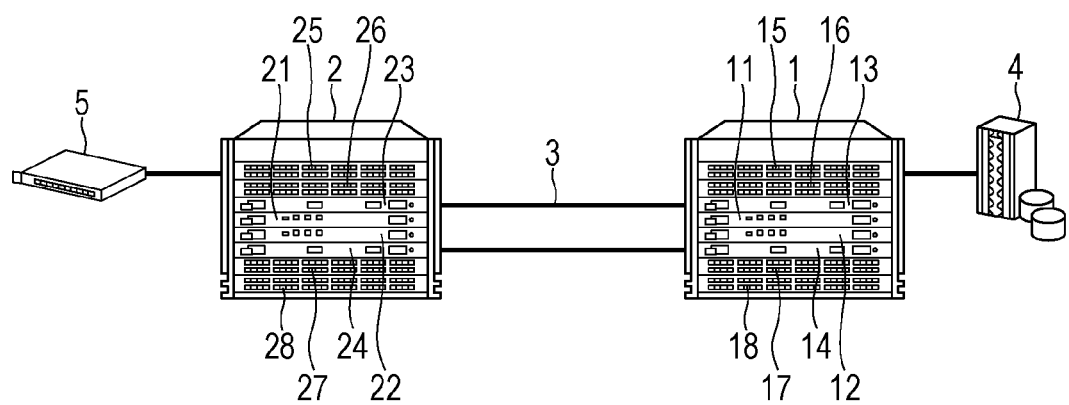
FIG. 1 is an exemplary outside view illustrating the structure of a storage system in a first embodiment.

FIG. 1 is an exemplary outside view illustrating the structure of a storage system in a first embodiment. As illustrated in FIG. 1, the storage system in the first embodiment has a center switch 1, a center switch 2, inter-chassis links (ICL) 3, a storage unit 4, and a server 5. The center switch 1 is an example of a first connection control apparatus, and the center switch 2 is an example of a second connection control apparatus.

In this embodiment, the storage unit 4 is connected to the center switch 1 and the server 5 is connected to the center switch 2. For convenience, only one device is connected to each of the center switches 1 and 2 in FIG. 1. In practice, however, a plurality of devices may be connected to each of the center switches 1 and 2. Specifically, a maximum number of devices equal to the number of ports, described later, with which the center switch 1 is provided may be connected to the center switch 1 and a maximum number of devices equal to the number of ports with which the center switch 2 is provided may be likewise connected to the center switch 2. In FIG. 1, various types of devices such as servers and storage units may be connected to both the center switches 1 and 2. When many devices are connected, an FC switch that simply performs routing may also be connected to the center switches 1 and 2.

The center switches 1 and 2 are mutually connected through ICLs 3. The ICL 3 will be described later in detail.

The center switch 1 has a control processor (CP) blades 11 and 12, each of which is a blade that includes a processor having control functions, core blades 13 and 14, and port blades 15 to 18. The center switch 2 has CP blades 21 and 22, core blades 23 and 24, and port blades 25 to 28. In this embodiment, the center switches 1 and 2 have the same structure.

The CP blades 11 and 12, core blades 13 and 14, and port blades 15 to 18 each have a thin (blade-type) case. When the case of each blade is inserted into the case of the center switch 1 and connected to a board provided on the rear surface of the case of the center switch 1, the blade and the center switch 1 are mutually connected.

Although, in FIG. 1, the center switches 1 and 2 each have four port blades, they many have any number of port blades within the range of 1 to 4. The center switches 1 and 2 in FIG. 1 each may have only up to four port blades. If the cases of the center switches 1 and 2 are enlarged, however, they may have more port blades.

Figure 2:
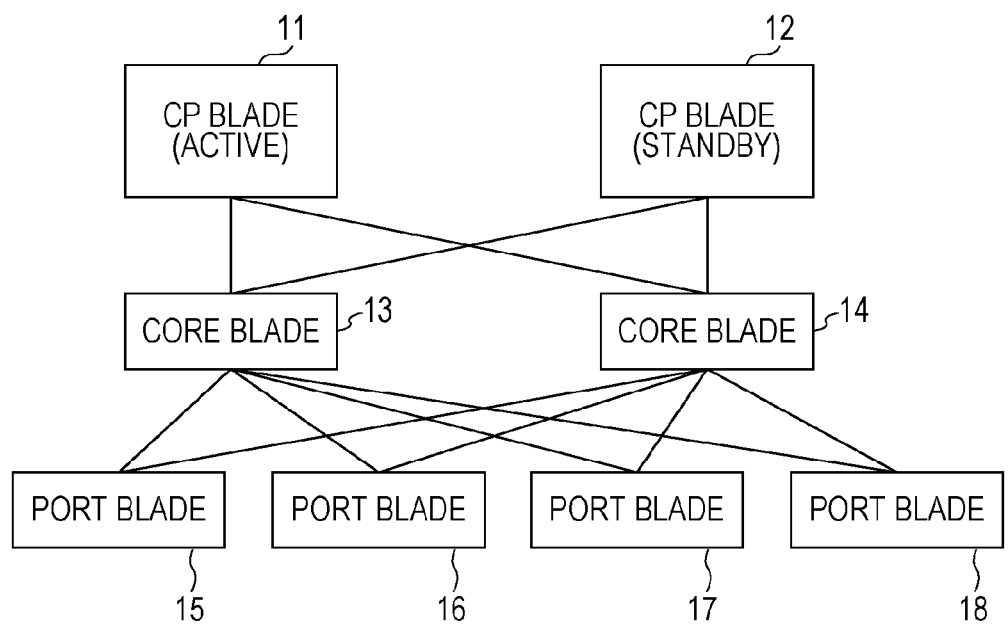
FIG. 2 illustrates connections of control processor (CP) blades, core blades, and port blades.

FIG. 2 illustrates connections of the CP blades 11 and 12, core blades 13 and 14, and port blades 15 to 18. As illustrated in FIG. 2, the CP blade 11 is connected to the core blades 13 and 14, and the CP blade 12 is also connected to the core blades 13 and 14. The core blade 13 is connected to the port blades 15 to 18, and the core blade 14 is also connected to the port blades 15 to 18. That is, both the CP blades 11 and 12 may communicate with both the core blades 13 and 14. Both the core blades 13 and 14 may communicate with all of the port blades 15 to 18. The center switch 2, the structure of which is similar to the structure of the center switch 1, is also connected as in FIG. 2.

The CP blade 11 (control processor) has a central processing unit (CPU), a hard disk, and a memory. In this embodiment, the CP blades 12, 21, and 22 each have a structure similar to the structure of the CP blade 11. One of the CP blades 11 and 12 is active and the other is standby. That is, the active one of the CP blades 11 and 12 is operating at normal times; if a failure occurs on the active side, the other CP blade, which is on the standby side, operates instead of the active CP blade. This is also true for the CP blades 21 and 22.

The core blade 13 has a CPU and a memory. The core blade 13 also has a plurality of ICL ports. In this embodiment, the core blades 14, 23, and 24 each have a structure similar to the structure of the core blade 13. Both the core blades 13 and 14 each carry out routing processing. If one of the core blades 13 and 14 goes down, the other takes over the processing. This is also true for the core blades 23 and 24. When an ICL port of the core blade 13 is connected to an ICL port of a core blade inserted into another center switch through one ICL 3, the core blade 13 and the core blade in the other center switch may mutually communicate at high speed. In this embodiment, the core blade 13 is connected to the core blade 23 though one ICL 3, and the core blade 14 is connected to the core blade 24 through one ICL 3.

The port blades 15 to 18 have ports used to connect servers, storage units, switches, and other devices. For example, the port blades 15 to 18 each have 64 ports. The storage unit 4 is connected to a port of the port blade 15, for example.

Figure 3:
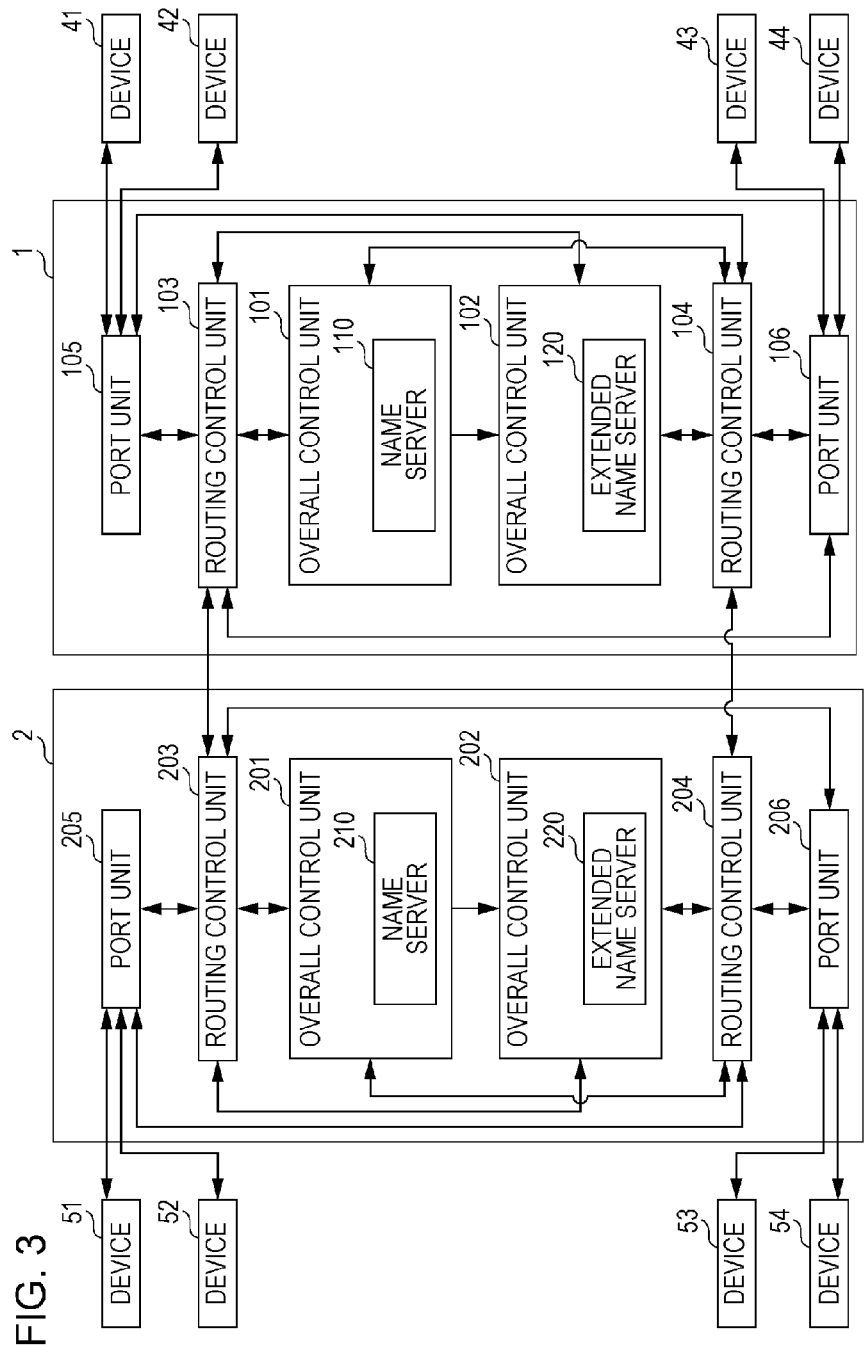
FIG. 3 is a block diagram illustrating the structure of the storage system in the first embodiment.

FIG. 3 is a block diagram illustrating the structure of the storage system in the first embodiment. An overall control unit 101 is implemented by, for example, the CP blade 11 in FIG. 1. An overall control unit 102 is implemented by, for example, the CP blade 12 in FIG. 1. A routing control unit 103 is implemented by, for example, the core blade 13 in FIG. 1. A routing control unit 104 is implemented by, for example, the core blade 14 in FIG. 1. A port unit 105 is implemented by, for example, the port blades 15 and 16 in FIG. 1. A port unit 106 is implemented by, for example, the port blades 17 and 18 in FIG. 1. An overall control unit 201 is implemented by, for example, the CP blade 21 in FIG. 1. An overall control unit 202 is implemented by, for example, the CP blade 22 in FIG. 1. A routing control unit 203 is implemented by, for example, the core blade 23 in FIG. 1. A routing control unit 204 is implemented by, for example, the core blade 24 in FIG. 1. A port unit 205 is implemented by, for example, the core blades 25 and 26 in FIG. 1. A port unit 206 is implemented by, for example, the port blades 27 and 28 in FIG. 1.

In FIG. 1, the storage unit 4 and server 5 have been respectively connected to the center switches 1 and 2 as typical examples. In FIG. 3, however, devices 41 to 44 are connected to the center switch 1 and devices 51 to 54 are connected to the center switch 2. Since the center switches 1 and 2 have the same structure as described above and symmetrically operate, the structure of the center switch 1 will be mainly described below. The described below is also applied to the center switch 2.

One of the overall control unit 101 and overall control unit 102 is active and performs processing at normal times, and the other is standby, which takes over the processing when the active one goes down. In this embodiment, the overall control unit 101 is active and the overall control unit 102 is standby. The routing control units 103 and 104 have a duplicate configuration; both are active and perform routing processing. That is, both the routing control units 103 and 104 perform routing processing at normal times. If one of them goes down, however, the other performs the processing that the one has been performing instead. Since the routing control units 103 and 104 operate similarly as described above, the routing control unit 103 will be taken as an example in the description below.

The overall control unit 101 has a name server 110. The overall control unit 101 acquires information about the devices 41 and 42 connected to the port unit 105 from the routing control unit 103 and also acquires information about devices 43 and 44 connected to the port unit 106 from the routing control unit 104. The overall control unit 101 then assigns port IDs (PIDs) to the devices 41 and 42 connected to the port unit 105 and the devices 43 and 44 connected to the port unit 106. The PID created by the overall control unit 101 will be described next. The PID is a six-digit number, for example. The first two digits of the PID indicate the DID of the center switch, the subsequent two digits indicate the number of a port of the center switch through which a device is connected to an adjacent switch, and the remaining two digits are reserved. When the DID of the center switch 1 is 1 and a device is connected to the center switch 2 through a port having port number 81, for example, the overall control unit 101 assigns PID 018100 to the device.

The overall control unit 101 then records the assigned PID in an address table stored in the name server 110 in the overall control unit 101. In the address table, devices and PIDs assigned to them are recorded in correspondence with each other. The overall control unit 101 outputs information about the assigned PID to the overall control unit 102.

The overall control unit 101 acquires, from the routing control unit 103, the PID assigned to the device connected to the center switch 2. The overall control unit 101 records the PID assigned to the device connected to the center switch 2 in the address table stored in the name server 110 in the overall control unit 101. That is, the name server 110 in the overall control unit 101, which is on the active side, has an address table in which the PID assigned to the device connected to the center switches 1 and 2 is recorded. The overall control unit 101 outputs information about the PID assigned to the device connected to the center switch 2 to the overall control unit 102.

Figure 4:
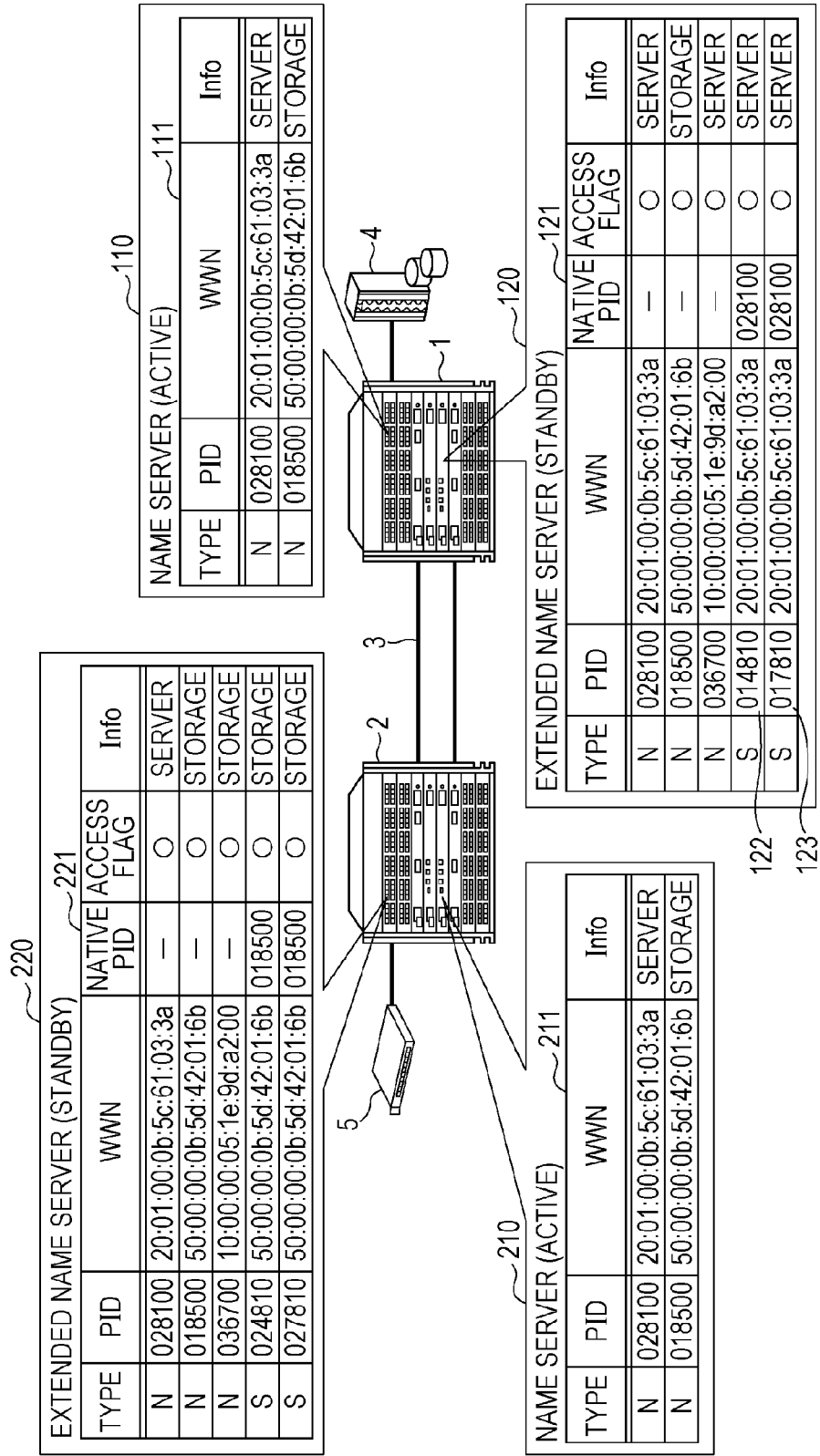
FIG. 4 illustrates the states of name servers and extended name servers in the first embodiment at normal times.

FIG. 4 illustrates the states of the name servers and extended name servers in the first embodiment at normal times. In FIG. 4, the storage unit 4 is connected to the center switch 1 and the server 5 is connected to the center switch 2. In this example, the world wide name (WWN) of the storage unit 4 is 50:00:00:0b:5d:42:01:6b and the WWN of the server 5 is 20:01:00:0b:5c:61:03:3a. As illustrated in FIG. 4, the name server 110 has an address table 111 in which the PIDs of the storage unit 4 and server 5 have been recorded. The address table 111 stores a type, a PID, a WWN and Info for each device. In this embodiment, the type indicates the type of a recorded PID. When the type is N, it indicates that the device is a node and the PID has been assigned to the device. When the type is S, it indicates that the device is a switch and the PID is a switching PID, which is used as an alternative as described later if another center switch goes down. Info indicates the type of the device. Similarly, as illustrated in FIG. 4, a name server 210 disposed in the overall control unit 201 in the center switch 2 also has an address table 211. The address tables 111 and 211 have the same contents, as illustrated in FIG. 4. The name server 110 and address table 111 are an example of a first table and the name server 210 and address table 211 are an example of a third table.

The overall control unit 101 receives, from the routing control unit 103, a request to send information about the PID assigned to a device connected to the center switch 1. The overall control unit 101 then outputs, to the routing control unit 103, the information about the PID assigned to the device connected to the center switch 1.

Either of the routing control units 103 and 104 may be used to send the PID of the device connected to the center switch 1 and receive the PID of the device connected to the center switch 2. In this embodiment, the routing control unit 103 is used to send and receive PIDs as an example.

Figure 5:
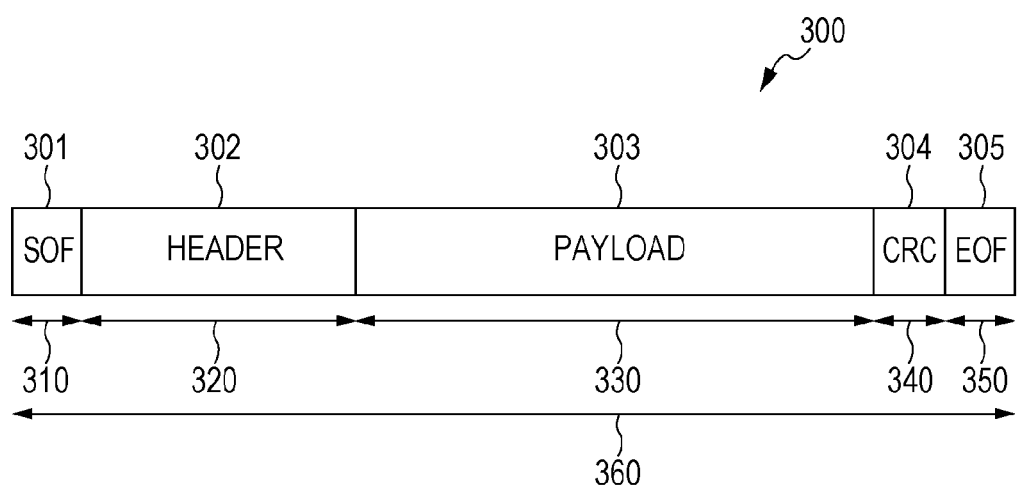
FIG. 5 illustrates the data structure of a fiber channel (FC) frame.

The overall control unit 101 acquires, from the routing control unit 103, the destination ID (DID) of a destination to which an FC frame is to be transferred, the DID being included in the FC frame. The FC frame will be described below. FIG. 5 illustrates the data structure of the FC frame. As illustrated in FIG. 5, the FC frame 300 has a start-of-frame (SOF) field 301, a header field 302, a payload field 303, a cyclic redundancy check (CRC) field 304, and an end-of-frame (EOF) field 305. The SOF field 301 is used as a delimiter that indicates the start of the frame. The size 310 of the SOF field 301 is four bytes, for example. The header field 302 is an area in which transferred information and the like are stored; a DID, a source ID (SID), and other information are stored therein. The size 320 of the header field 302 is 24 bytes, for example. The payload field 303 includes user data. The size 330 of the payload field 303 is a maximum of 2112 bytes. The CRC field 304 is an area to store information about CRC. The size 340 of the CRC field 304 is four bytes, for example. The EOF field 305 is used as a delimiter that indicates the end of the frame. The size 350 of the EOF field 305 is four bytes, for example. The total size 360 of the FC frame 300 is a maximum of 2,148 bytes, for example. The DID of the FC frame 300 may be acquired from the header field 302.

The overall control unit 101 decides whether the acquired DID is included in the address table in the name server 110. If the PID is included, the overall control unit 101 outputs the PID of the transfer destination to the routing control unit 103 to command the routing control unit 103 to transfer the FC frame. If the PID is not included, the overall control unit 101 commands the routing control unit 103 to discard the FC frame.

If the overall control unit 101 is notified by the routing control unit 103 that the center switch 2 has gone down, the overall control unit 101 commands the overall control unit 102 to store, in an extended name server 120, the fact that the center switch 2 has gone down.

The overall control unit 102 may cause a failure after the center switch 2 has gone down. In this case, connection is preserved or performance is preserved in this embodiment. When connection is preserved, routing using the switching port is preserved without alteration. When performance is preserved, routing using the switching port is abandoned and only routing that is being carried out by the overall control unit 101 for the device connected to the center switch 1 is continued. In connection preservation, all routings that are being carried out at that time are assured, but the load to the overall control unit 101 is increased due to an increase in the amount of processing. In performance preservation, performance is preserved because the overall control unit 101 performs only processing similar to processing so far, but routing through the down center switch is disabled.

In connection preservation, if the overall control unit 101 causes a failure, the overall control unit 101 receives a notification of synchronization with the extended name server 120 from the overall control unit 102 so that the extended name server 120 is used. In this case, the overall control unit 101 acquires an extended address table 121 from the overall control unit 102. If the overall control unit 102 causes a failure, the overall control unit 101 uses the extended address table 121 to perform routing to the connected device through the center switch 2. The overall control unit 101 is an example of an active control unit.

The overall control unit 102 includes the extended name server 120. The extended address table 121 stored in the extended name server 120 includes a type field, a PID field, a WWN field, a native PID field, an access flag field, and an Info field. That is, the extended address table 121 is identical to the address table stored in the name server 110, except that the native PID field and access flag field are added. A native PID is an original PID assigned to a device connected to a down center switch. The native PID is stored so as to correspond to a switching PID, which is created to connect to the device connected to the down center switch. The switching PID will be described later in detail. The access flag field indicates whether a connection may be made by using the PID described on the row on which the access flag field is indicated. Specifically, a circle (○) is indicated in the access flag field if an access to the device is possible by using the PID described on the row on which the access flag is indicated, and a cross (x) is indicated if not. The overall control unit 102 acquires, from the overall control unit 101, information about the PID assigned to the center switch 1 and the PID assigned to the device connected to the center switch 2.

The overall control unit 102 stores the acquired PIDs in the address table in the extended name server 120. Furthermore, the overall control unit 102 creates information about the switching PID for a device other than the device directly connected to the center switch 1 and stores the created information in the address table.

Now, an example of creating a switching PID and storing it in the address table will be described. The switching PID is a six-digit number, as with the normal PID. The first two digits of the switching PID indicate the DID of the center switch. The subsequent one digit of the switching PID indicates a value obtained by adding the port number of the port in use by the ICL to the position at which the core blade of the center switch is inserted. The subsequent one digit in the switching PID indicates a position at which a port blade of the adjacent center switch is inserted. The remaining two digits indicate the port number of a port to which the device is connected. For example, it is assumed that the DID of the center switch 1 is 1, the core blade of the center switch 1 is inserted into a third slot, and the port number of the ICL port connected to the adjacent center switch is 1. It is also assumed that the port blade of the adjacent center switch is inserted into a first slot and the port number of a port, of the adjacent center switch, to which the device is connected is 1. Then, the overall control unit 102 creates 014101 as the switching PID. The switching PID indicates a route from the center switch to the port to which the device is connected, without using the original PID assigned to the device. That is, when the switching PID is used, the routing control unit 103 may transfer a FC frame to a port to which a device to which to transfer the FC frame is connected, for example. A port subject to routing in which a switching PID is used will be referred to below as a switching port. The switching PID is an example of route information indicating a connection route from the connection control apparatus to the port, of the adjacent connection control apparatus, to which the device having the address is connected.

The overall control unit 102 stores the created switching PID in the PID field of the extended address table 121 in the extended name server 120. The overall control unit 102 indicates S in the type field corresponding to the switching PID and stores the value of the WWN of the device in the WWN field. The overall control unit 102 stores the value of the original PID of the device in the native PID field corresponding to the switching PID. The overall control unit 102 indicates the state of access in the access flag field. The overall control unit 102 stores the type of the device in the Info field.

For example, the address table in the extended name server 120 becomes like the extended address table 121 in FIG. 4. As illustrated in FIG. 4, the original PIDs of the storage unit 4 and server 5 have been stored in the extended address table 121 in the extended name server 120. The switching PID of the server 5, which is a device connected through the center switch 2, has been stored in the extended address table 121. PIDs 122 and 123 are the switching PID of the server 5. The PID 122 is a switching PID used to connect to the server 5 through a route that passes through the ICL 3 connected to a port with port number 1 on the core blade inserted into the third slot. The PID 123 is a switching PID used to connect to the server 5 through a route that passes through the ICL 3 connected to a port with port number 1 on the core blade inserted into a sixth slot. Since, in this embodiment, two core blades are inserted and each core blade is connected to the center switch 2 through the relevant ICL 3, two routes are provided. Accordingly, two switching PIDs, each of which uses one route, are created. If one core blade is used, for example, only one switching PID is created for one device.

The overall control unit 102 stores the extended address table 121 in its extended name server 120 as described above. Similarly, the overall control unit 202 in the center switch 2 stores an extended address table 221 in its extended name server 220 as illustrated in FIG. 4. Since the switching PID is created for a device connected to other than the center switch, the extended address table 121 and extended address table 221 have different contents as illustrated in FIG. 4.

If the overall control unit 102 detects a failure caused in the overall control unit 101, which is on the active side, the overall control unit 101 becomes active and takes over routing that the overall control unit 101 has been carrying out.

Figure 6:
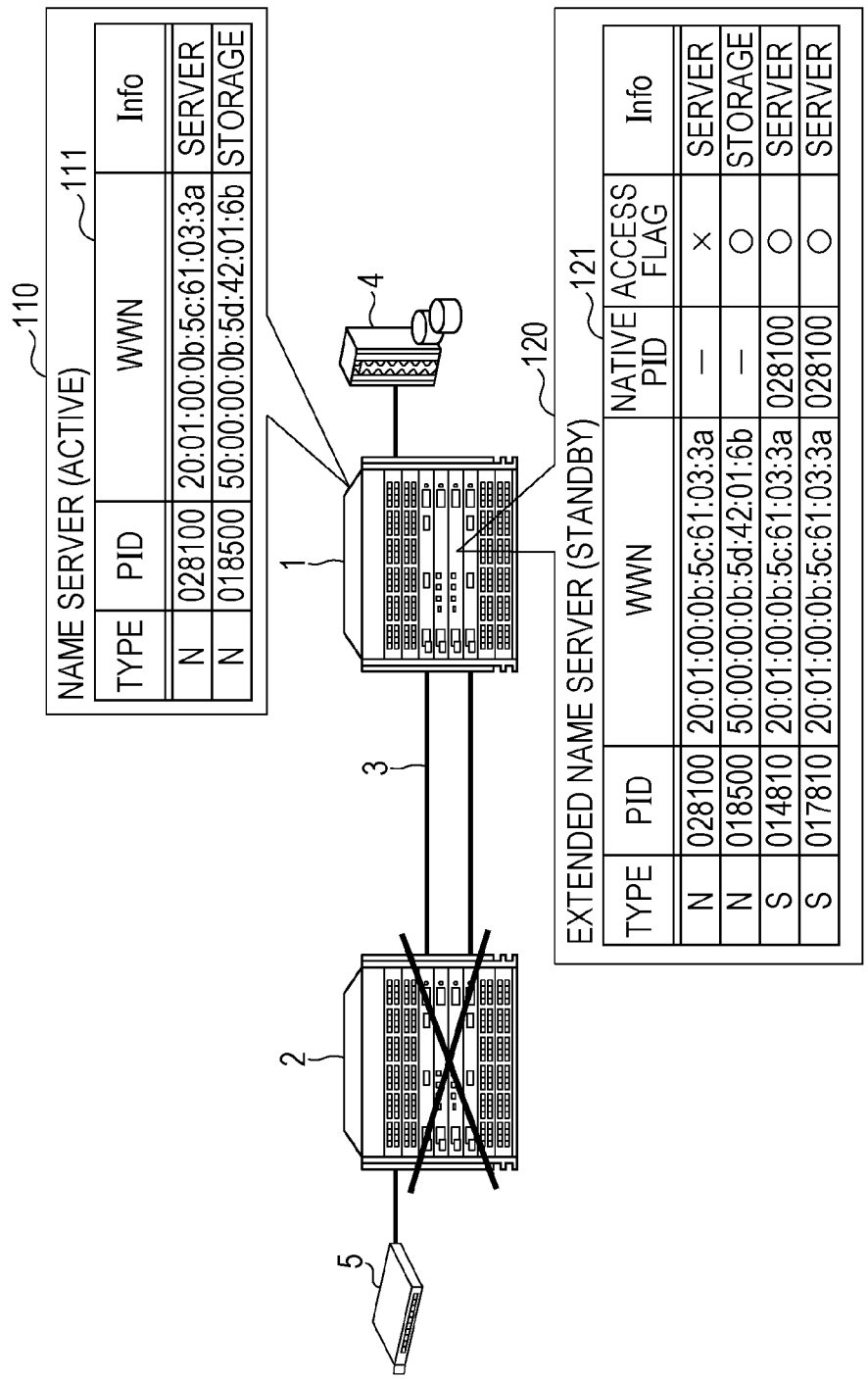
FIG. 6 illustrates a state in which one of center switches in the first embodiment goes down, and particularly the state of the expanded name server in another center switch.

If both the overall control units 201 and 202 in the center switch 2 cause a failure and the center switch 2 goes down, the overall control unit 102 takes over routing that the overall control unit 201 or overall control unit 202 has been carrying out. In this case, the overall control unit 102 uses the extended name server 120 to carry out routing. Operation carried out by the overall control unit 102 when the center switch 2 goes down will be described with reference to FIG. 6. FIG. 6 illustrates a state in which one of the center switches in the first embodiment goes down, and particularly the state of the expanded name server in the other center switch. In FIG. 6, the center switch 2 goes down from the state in FIG. 4.

The overall control unit 102 receives, from the overall control unit 101, a command to reflect the down state of the center switch 2 into the extended name server 120. In the extended address table 121 stored in the extended name server 120, the overall control unit 102 indicates x in the access flag field corresponding to the device connected through the center switch 2. In FIG. 6, the device connected through the center switch 2 is the server 5, so the overall control unit 102 indicates x in the access flag field on the row on which the WWN of the server 5 is indicated and N is indicated as the type.

The overall control unit 102 then decides whether a switching PID that uses the PID on the row on which x is indicated in the access flag field as the native PID has been stored in the extended address table 121. Specifically, the overall control unit 102 searches for the PID for which x is indicated in the access flag field from native PIDs to decide whether there is a switching PID corresponding to the PID. If there is a switching PID corresponding to the PID for which x is indicated in the access flag field, the overall control unit 102 commands the routing control unit 103 to perform prioritized port setting. Prioritized port setting is to specify another center switch as the routing destination of an FC frame received from a connected device. An example of prioritized setting is that when the center switch 2 receives an FC frame from the device connected to the center switch 2, a setting is made so that the received FC frame is transferred to the routing control unit 103 in the center switch 1. Prioritized port setting will be described later in detail. If there is no switching PID corresponding to the PID for which x is indicated in the access flag field, the overall control unit 102 abandons routing to the device to which the PID is assigned.

When the overall control unit 102 receives a notification, from the routing control unit 103, that routing using a switching port has been set, the overall control unit 102 confirms operation performed when a failure occurs in the overall control unit 102. The overall control unit 102 may cause a failure while carrying out routing using a switching port. In this case, connection is preserved or performance is preserved in this embodiment. When connection is preserved, routing using the switching port is preserved without alteration. When performance is preserved, routing using the switching port is abandoned and only routing that is being carried out by the overall control unit 101 for the device connected to the center switch 1 is continued. In connection preservation, all routings that are being carried out at that time are assured, but the load to the overall control unit 101 is increased due to an increase in the amount of processing. In performance preservation, performance is preserved because the overall control unit 101 performs only processing similar to processing so far, but routing through the down center switch is disabled. In this embodiment, the overall control unit 102 receives a command to select connection preservation or performance preservation in advance.

In connection preservation, if the overall control unit 102 causes a failure, the overall control unit 102 notifies the overall control unit 101 of synchronization with the extended name server 120 so that the extended name server 120 is used. In performance preservation, however, the overall control unit 102 does not notify the overall control unit 101. This is because when synchronization with the extended name server 120 is not commanded, even if the overall control unit 102 causes a failure, the overall control unit 101 continues the current processing.

In routing using a switching port, the overall control unit 102 receives, from the routing control unit 103, an inquiry about the transfer destination of the received FC frame. Specifically, the overall control unit 102 receives the DID of the transfer destination from the routing control unit 103. The overall control unit 102 searches the extended address table 121 stored in the extended name server 120 for a switching PID for which the DID of the transfer destination is written as a native PID. The overall control unit 102 extracts the switching PID that is searched for and notifies the routing control unit 103 of the switching PID. If there is no switching PID for which the received DID is written as a native PID, the overall control unit 102 commands the routing control unit 103 to discard the FC frame.

In FIG. 6, for example, the overall control unit 102 receives, from the routing control unit 103, an inquiry about the transfer destination of an FC frame to be transferred to the server 5. Specifically, the overall control unit 102 receives, from the routing control unit 103, 028100 as the DID specified by the FC frame. The overall control unit 102 searches the extended address table 121 for the native ID the value of which is 028100. In FIG. 6, there are two routes to devices connected to the center switch 2, so the overall control unit 102 extracts two rows. The overall control unit 102 then selects one of the extracted rows. For example, the overall control unit 102 selects a row on which a switching PID that indicates a low load at that time is indicated. The overall control unit 102 notifies the routing control unit 103 of the switching PID indicated on the selected row. The overall control unit 102 is an example of a standby control unit. The extended name server 120 and extended address table 121 are an example of a second table.

The routing control unit 103 acquires an FC frame supplied to the port unit 105 or 106. The routing control unit 103 then acquires a DID from the acquired FC frame. If a prioritized port is not used to transfer the FC frame, the routing control unit 103 uses the acquired DID to inquire the transfer destination of the overall control unit 101. The routing control unit 103 then receives the PID of the transfer destination of the FC frame from the overall control unit 101. The routing control unit 103 transfers the FC frame to the device to which the received PID is assigned through the port unit 105 or 106.

If a prioritized port is used to transfer the FC frame, the routing control unit 103 uses the acquired DID to inquire the transfer destination of the overall control unit 102. The routing control unit 103 then receives the switching PID of the transfer destination of the FC frame from the overall control unit 102. The routing control unit 103 references the received switching PID and acquires a switching port to which the device to which to transfer the FC frame is connected and also acquires a route to the switching port. The routing control unit 103 transfers the FC frame through the port unit 105 or 106 so that the FC frame arrives at the switching port through the acquired route.

If, in FIG. 6, the routing control unit 103 inquires the transfer destination of an FC frame to be transferred to the server 5 of the overall control unit 102, for example, the routing control unit 103 receives 014810 or 017810 as the switching PID from the overall control unit 102. In this example, it is assumed that the routing control unit 103 has received 014810. The routing control unit 103 then sends the FC frame so that it is output from a port with port number 10 on the port blade inserted into the eighth slot of the center switch 2 through the port with port number 1 on the port blade inserted into the third slot.

If both the overall control units 101 and 102 cause a failure, the routing control unit 103 receives a command to perform routing using a switching PID from, for example, the routing control unit 203 or 204 in the center switch 2. The routing control unit 103 then sets a prioritized port so that when the routing control unit 103 receives a FC frame from a device (the server 5, for example) connected to the center switch 1, the received FC frame is transferred to the routing control unit 203 in the center switch 2 through the prioritized port. The routing control unit 103 further sets a switching port that is subject to control of transfer using a switching PID, control being carried out by the overall control unit 202 on the standby side in the center switch 2 when an FC frame is sent to the device connected to the center switch 1. That is, with a switching port having been set, when the routing control unit 103 receives an FC frame to be transferred to the device connected to the center switch 1, the routing control unit 103 transfers the FC frame to the routing control unit 203.

The port units 105 and 106 receive FC frames from devices connected to ports. The port units 105 and 106 output the received FC frames to the routing control unit 103 or 104.

The port units 105 and 106 respectively receive, from the routing control units 103 and 104, FC frames to be transferred. The port units 105 and 106 output the received FC frames to specified devices or ports.

Next, three types of processing executed by the storage system in the first embodiment will be described with reference to FIGS. 7 to 10: processing at normal times, processing executed at a time when one center switch goes down, and processing executed while the one center switch is in a down state. In this embodiment, the two routing control units mounted in each center switch operate similarly and two port units mounted therein operate similarly. In the description below, therefore, the routing control unit 103 and port unit 105 in the center switch 1 and the routing control unit 203 and port unit 205 in the center switch 2 are taken as examples.

Figure 7:
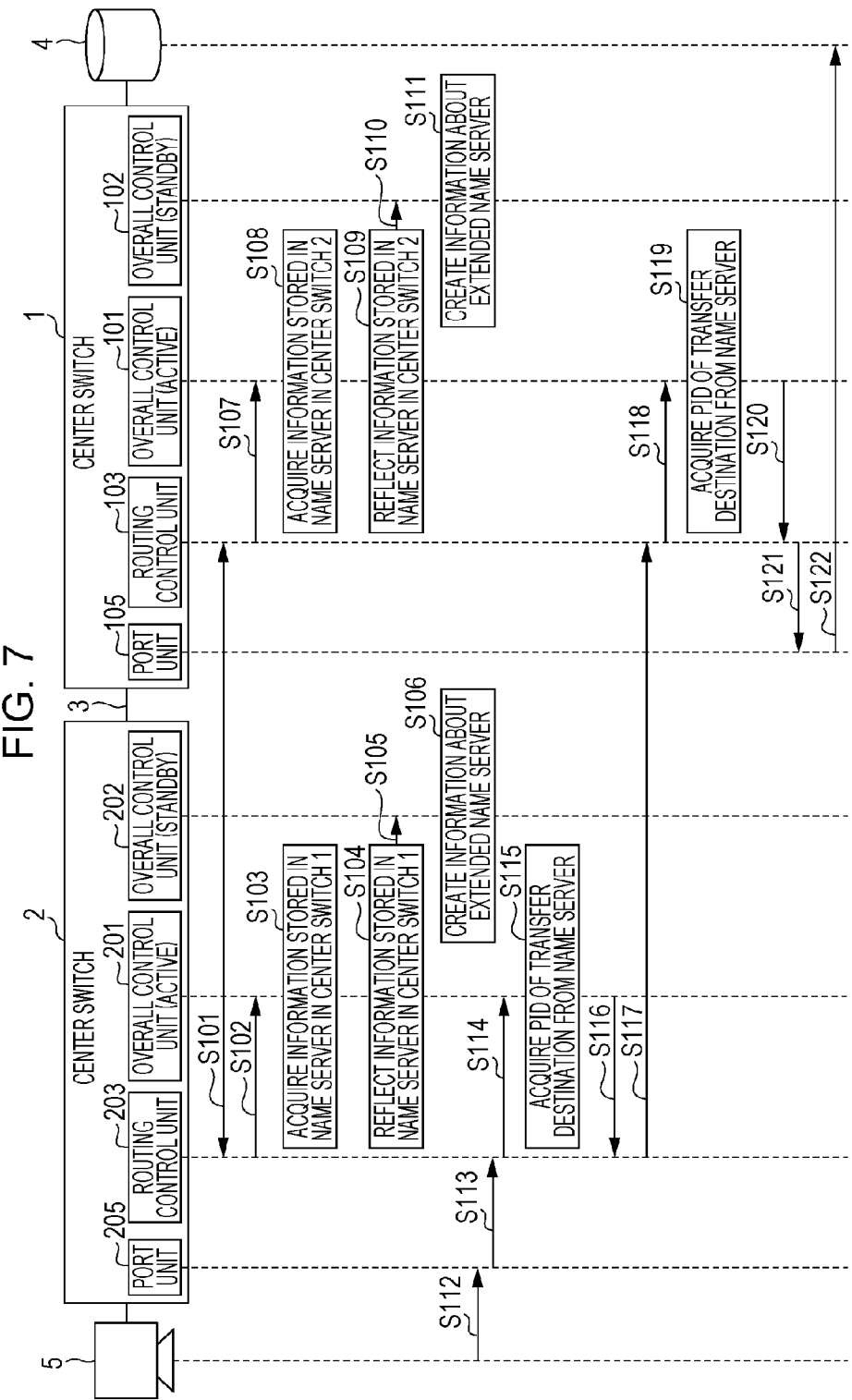
FIG. 7 is a sequence diagram of processing executed by the storage system in the first embodiment at normal times.

FIG. 7 is a sequence diagram of processing executed by the storage system in the first embodiment at normal times. Processing executed by the storage system in the first embodiment at normal times will be described with reference to FIG. 7.

Steps S101 to S111 indicate creation processing executed by the name servers 110 and 210 and extended name servers 120 and 220. At normal times, the routing control units 103 and 203 exchange information stored in their corresponding name servers at fixed intervals through the ICL 3 (operation S101).

The routing control unit 203 sends information acquired from the address table 111 stored in the name server 110 in the center switch 1 to the overall control unit 201 (operation S102). The overall control unit 201 acquires the information in the address table 111 stored in the name server 110 from the routing control unit 203 (operation S103). The overall control unit 201 then reflects the information in the address table 111 stored in the name server 110 into the address table 211 stored in the name server 210 in the overall control unit 201 (operation S104). Furthermore, the overall control unit 201 sends the information in the address table 211 stored in the name server 210 to the overall control unit 202 (operation S105).

The overall control unit 202 stores information about the device connected to the center switch 2 and information about the device connected to the center switch 1 in the extended address table 221. Furthermore, the overall control unit 202 creates a switching PID from the PID assigned to the device connected to the center switch 1, stores the created switching PID in the extended address table 221 together with a native PID and the like, creating information about the extended name server 220 (operation S106).

Similarly, the routing control unit 103 sends information acquired from the address table 211 stored in the name server 210 in the center switch 2 to the overall control unit 101 (operation S107). The overall control unit 101 acquires the information in the address table 211 stored in the name server 210 from the routing control unit 103 (operation S108). The overall control unit 101 then reflects the information in the address table 211 stored in the name server 210 into the address table 111 stored in the name server 110 in the overall control unit 101 (operation S109). Furthermore, the overall control unit 101 sends the information in the address table 111 stored in the name server 110 to the overall control unit 102 (operation S110).

The overall control unit 102 stores information about the device connected to the center switch 1 and information about the device connected to the center switch 2 in the extended address table 121. Furthermore, the overall control unit 102 creates a switching PID from the PID assigned to the device connected to the center switch 2, stores the created switching PID in the extended address table 121 together with a native PID and the like, creating information about the extended name server 120 (operation S111).

Steps S112 to S122 indicate processing executed to send data from the server 5 to the storage unit 4. The server 5 sends an FC frame to be sent to the storage unit 4 to the port unit 205 (operation S112).

The port unit 205 receives the FC frame and sends it to the routing control unit 203 (operation S113).

The routing control unit 203 acquires the DID of the FC frame and uses the acquired DID to inquire the transfer destination of the FC frame of the overall control unit 201 (operation S114).

The overall control unit 201 receives the DID from the routing control unit 203 and uses the received DID to acquire the PID of the storage unit 4, which is the transfer destination, from the name server 210, (operation S115). The overall control unit 201 then sends the acquired PID of the transfer destination to the routing control unit 203 (operation S116).

The routing control unit 203 receives the PID of the transfer destination from the overall control unit 201. The routing control unit 203 then makes a decision as to transmission to the center switch 1 from the received PID and sends the FC frame to the routing control unit 103 in the center switch 1 through the ICL 3 (operation S117).

The routing control unit 103 receives the FC frame, acquires the DID from the received FC frame, and uses the acquired DID to inquire the transfer destination of the FC frame of the overall control unit 101 (operation S118).

The overall control unit 101 receives the DID from the routing control unit 103 and uses the received DID to acquire the PID of the storage unit 4, which is the transfer destination, from the name server 110 (operation S119). The overall control unit 101 then sends the acquired PID of the transfer destination to the routing control unit 103 (operation S120).

The routing control unit 103 acquires the PID of the transfer destination, which has been sent from the overall control unit 101. The routing control unit 103 then sends the FC frame to the port unit 105 to which the device assigned the PID of the transfer destination is connected (operation S121).

The port unit 105 receives the FC frame from the routing control unit 103 and sends the received FC frame to the storage unit 4, which is the device at the transfer destination, (operation S122).

Figure 8:
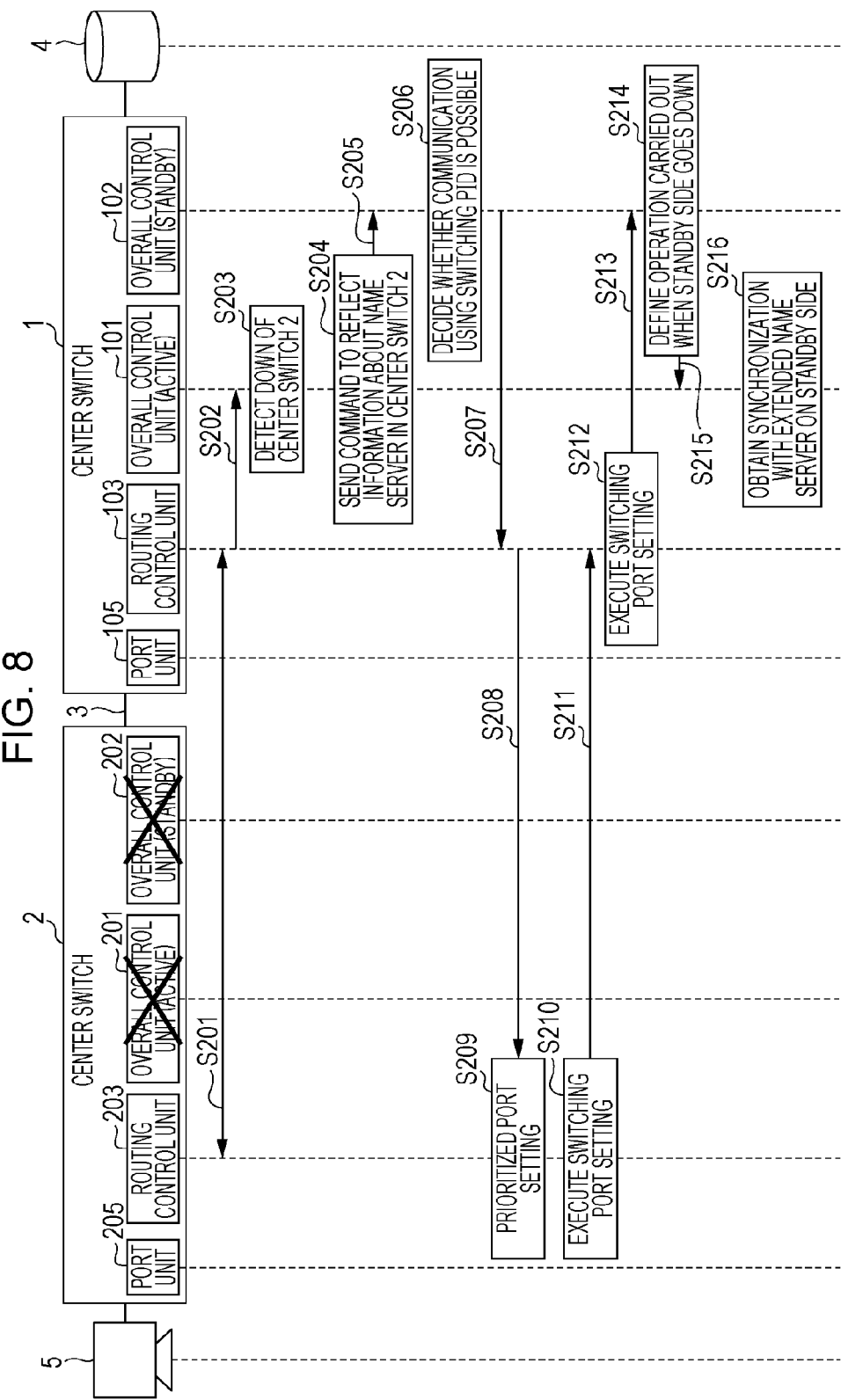
FIG. 8 is a sequence diagram of processing executed by the storage system in the first embodiment at a time when one center switch goes down.

Next, processing executed by the storage system in the first embodiment at the occurrence of a center switch down will be described with reference to FIG. 8. FIG. 8 is a sequence diagram of processing executed by the storage system in the first embodiment at a time when one center switch goes down. A case in which both the overall control units 201 and 202 have caused a failure and the center switch 2 has gone down will be described here.

The routing control units 203 and 103 exchange information through the ICL 3. Even at a time when a failure occurs, the routing control units 203 and 103 are exchanging information (operation S201). After the overall control units 201 and 202 have caused a failure, the routing control unit 103 becomes unable to receive information from the routing control unit 203.

The routing control unit 103 notifies the overall control unit 101 that the routing control unit 103 is unable to receive information from the routing control unit 203 (operation S202).

Upon receipt of a notification from the routing control unit 203, the overall control unit 101 detects a down of the center switch 2 (operation S203). The overall control unit 101 then commands the overall control unit 102 to reflect the information about the name server 210 in the center switch 2 (operation S204).

The overall control unit 102 receives a command to reflect the information about the name server 210 in the center switch 2 from the overall control unit 101 (operation S205). In the extended address table 121 stored in the extended name server 120 in the overall control unit 102, the overall control unit 102 indicates x in the access flag field corresponding to the device connected to the center switch 2. The overall control unit 102 decides whether communication using a switching PID is possible depending on whether the switching PID that uses the PID of the device for which x is indicated in the access flag field as a native PID is indicated in the extended address table 121 (operation S206). In the description below, it is assumed that communication using a switching PID is possible. The overall control unit 102 notifies the routing control unit 103 that communication using a switching PID is possible (operation S207).

Upon receipt of the notification from the overall control unit 102, the routing control unit 103 notifies the routing control unit 203 of communication using a switching PID through the ICL 3 (operation S208).

Upon receipt of the notification from the routing control unit 103, the routing control unit 203 sets the port connected to the routing control unit 103 as a prioritized port. That is, the routing control unit 103 performs prioritized port setting in which the transfer destination of the FC frame received from the device is set to the center switch 1 (operation S209). The routing control unit 203 also performs switching port setting in which output of the FC frame received from the routing control unit 103 to the specified port is set (operation S210). The routing control unit 203 then notifies the routing control unit 103 that a witching port has been set (operation S211).

Upon receipt of the notification from the routing control unit 203, the routing control unit 103 performs switching port setting so that the FC frame transferred to the center switch 2 is received and routing to the switching port may be carried out (operation S212). The routing control unit 103 then notifies the overall control unit 102 that switching port setting has been completed (operation S213).

Upon receipt of the notification from the routing control unit 103, the overall control unit 102 defines connection preservation or performance preservation as operation carried out when the standby side (overall control unit 102) goes down (operation S214). When performance preservation is defined, subsequent processing is not carried out. When connection preservation is defined, the overall control unit 102 notifies the overall control unit 101 of connection preservation (operation S215).

Upon receipt of the notification of connection preservation, the overall control unit 101 obtains synchronization with the extended name server 120 (operation S216). That is, the overall control unit 101 makes a setting so that when the standby side (overall control unit 102) goes down, routing using the extended address table 121 stored in the extended name server 120 is taken over.

Figure 9:
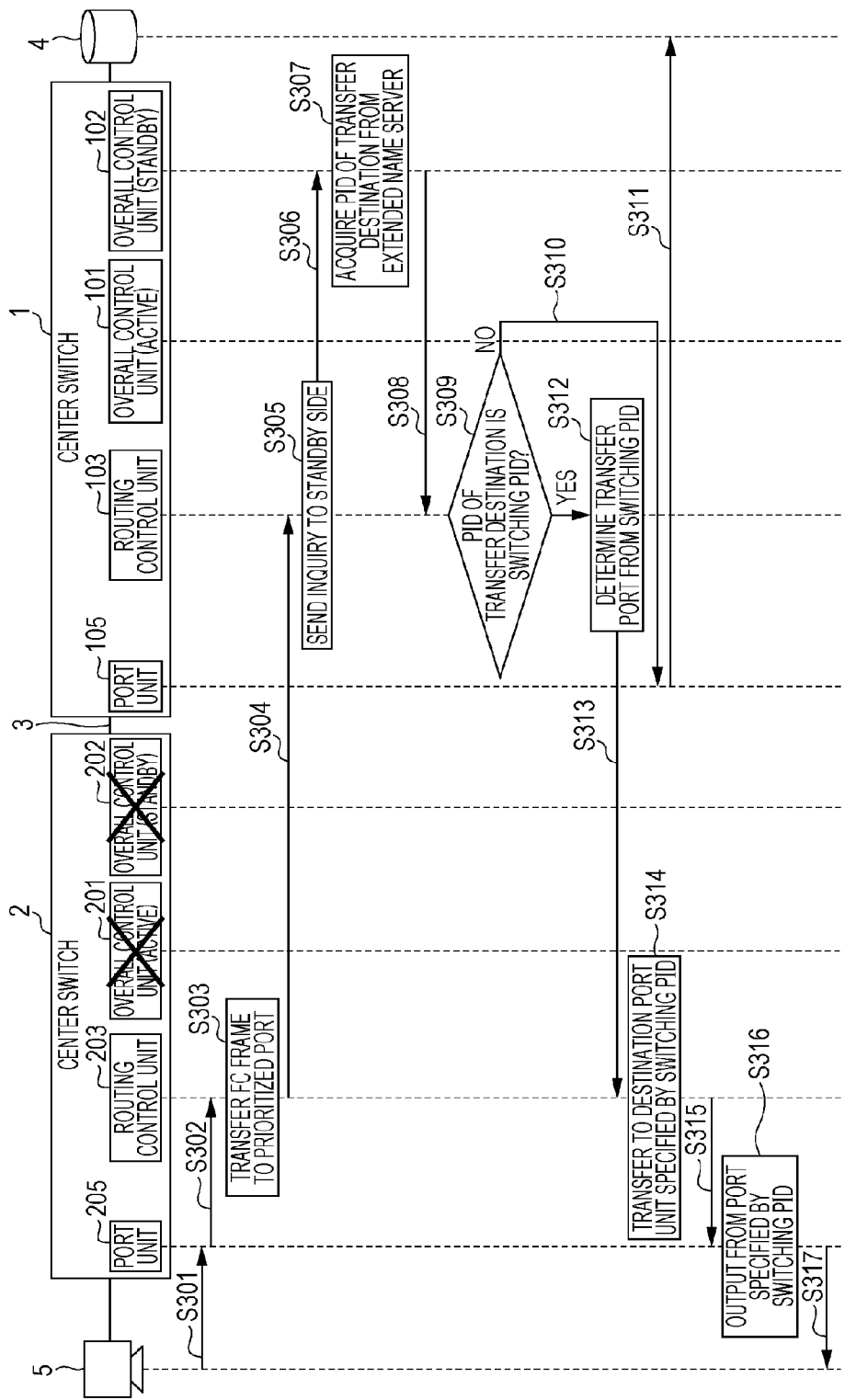
FIG. 9 is a sequence diagram of transfer processing executed by the storage system in the first embodiment while the one center switch is in a down state.

Next, flow of FC frame transfer processing with one center switch in the storage system in the first embodiment placed in a down state will be described with reference to FIG. 9. FIG. 9 is a sequence diagram of transfer processing executed by the storage system in the first embodiment while the one center switch is in a down state.

The server 5 connected to the center switch 2 outputs an FC frame to be sent to another device to the port unit 205 of the center switch 2 (operation S301).

The port unit 205 receives the FC frame from the server 5 and sends the FC frame to the routing control unit 203 (operation S302).

The routing control unit 203 receives the FC frame from the port unit 205 and transfers the received FC frame to a prioritized port (operation S303). Thus, the FC frame output from the server 5 is transferred from the routing control unit 203 in the center switch 2 to the routing control unit 103 in the center switch 1 (operation S304).

The routing control unit 103 decides that the FC frame received from the routing control unit 203 has been transferred by using a prioritized port. The routing control unit 103 acquires a DID from the FC frame. The routing control unit 103 then uses the acquired DID to inquire the transfer destination of the FC frame of the overall control unit 102, which is on the standby side, (operation S305).

The overall control unit 102 receives the inquiry, which has been made by using the DID about the transfer destination, from the routing control unit 103 (operation S306). The overall control unit 102 then acquires the PID of the transfer destination of the FC frame that the server 5 has output from the extended name server 120 in the overall control unit 102 (operation S307). The overall control unit 102 notifies the routing control unit 103 of the acquired PID (operation S308). The notification indicates whether the PID is a switching PID or the PID assigned by the center switch 1 to the device.

The routing control unit 103 receives the PID and decides whether it is a switching PID (operation S309). If the received PID is the PID that the center switch 1 has assigned to the device (the result in operation 309 is No), the routing control unit 103 sends the FC frame to the port unit 105 to which the device assigned the PID of the transfer destination is connected (operation S310).

The port unit 105 sends the FC frame received from the routing control unit 103 to the storage unit 4, which is the device at the transfer destination, (operation S311).

If the received PID is a switching PID (the result in operation S309 is Yes), the routing control unit 103 references the switching PID and determines a transport port to which to transport the FC frame (operation S312). The routing control unit 103 then sends the FC frame to the routing control unit 203 through the route indicated in the switching PID (operation S313).

The routing control unit 203 references the switching PID, and transfers the FC frame to the port unit 205 at the destination specified by the switching PID (operation S314). Thus, the FC frame sent from the routing control unit 103 is transferred to the port unit 205 (operation S315).

The port unit 205 outputs the FC frame from the port specified by the switching PID (operation S316).

If the destination of the FC frame is the server 5, for example, the FC frame sent from the routing control unit 103 is sent to the server 5 because the server 5 is connected to the port specified by the switching PID (operation S317).

Figure 10:
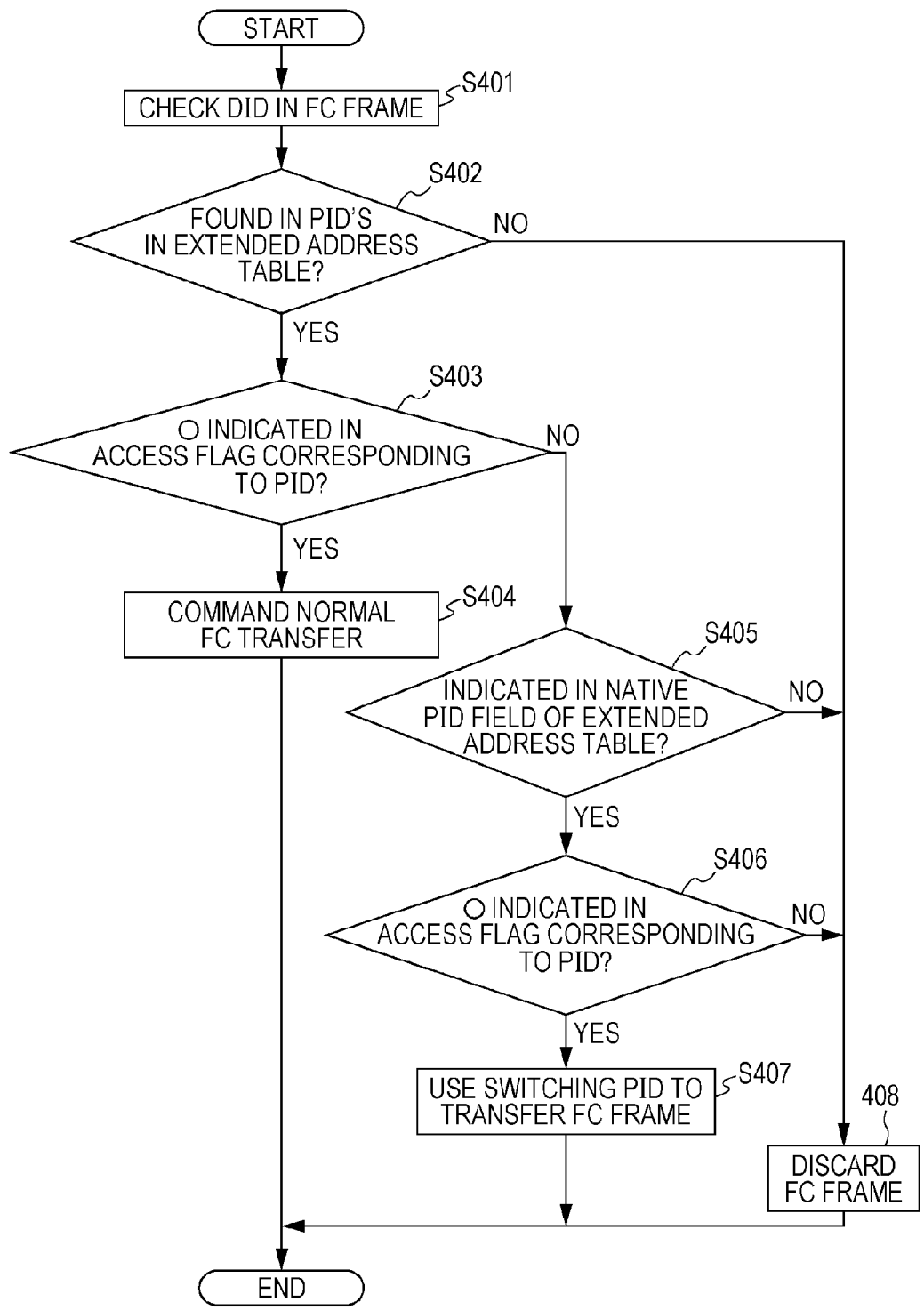
FIG. 10 is a flowchart of processing executed by an extended name server at a time when one center switch goes down.

When one center switch goes down, the extended name server in the other center switch performs processing. This processing will be described next with reference to FIG. 10. FIG. 10 is a flowchart of processing executed by an extended name server at a time when one center switch goes down. In an example described below, the center switch 2 goes down and the extended name server 120 performs processing.

The extended name server 120 checks whether the DID in the FC frame received from the routing control unit 203 in the center switch 2 is found in the extended address table 121 (operation S401). The extended name server 120 then decides whether the received DID is found in the PIDs in the extended address table 121 (operation S402).

If the received DID is not found in the extended address table 121 (the result in operation S402 is No), the extended name server 120 notifies the overall control unit 102 that the DID, which is the destination of the FC frame, is not indicated in the extended address table 121. The overall control unit 102 commands the routing control unit 103 to discard the FC frame (operation S408).

If the received DID is found in the extended address table 121 (the result in operation S402 is Yes), the extended name server 120 decides whether ○ is indicated in the access flag field on the row including the PID (operation S403). If ○ is indicated in the access flag field (the result in operations D403 is Yes), the extended name server 120 commands the routing control unit 103 to carry out normal FC frame transfer (operation S404).

If x is indicated in the access flag field (the result in operations S403 is No), the extended name server 120 decides whether the PID is indicated in the native PID field in the extended address table 121 (operation S405). If the PID is not indicated in the native PID field (the result in operation S405 is No), the overall control unit 102 commands the routing control unit 103 to discard the FC frame (operation S408).

If the PID is indicated in the native PID field (the result in operation S405 is Yes), the overall control unit 102 decides whether ○ is indicated in the access flag field on the row including the PID in the native PID field (operation S406). If x is indicated in the access flag field (the result in operations S406 is No), the overall control unit 102 commands the routing control unit 103 to discard the FC frame (operation S408).

If ○ is indicated in the access flag field (the result in operations S406 is Yes), the extended name server 120 commands the routing control unit 103 to transfer the FC frame by using the switching PID. Then, the overall control unit 102 and routing control unit 103 transfer the FC frame by using the switching PID (operation S407).

As described above, the fiber channel switch, which is the center switch in this embodiment, continues routing processing by using an extended name server if another center switch connected to the fiber channel switch goes down, the processing having been carried out by the other center switch. Thus, even if a center switch with a redundant configuration causes failures in both the active side and the standby side and thereby goes down, communication with a device connected to the down center switch may be continued.

Second Embodiment

Next, a storage system in a second embodiment will be described. The storage system in this embodiment differs from the storage system in the first embodiment in that a switch that simply performs routing is connected to a center switch and another device is further connected to the switch. The switch that simply performs routing will be referred to below as the transfer switch. The center switch in this embodiment has the same structure as in FIGS. 2 and 3.

Figure 11:
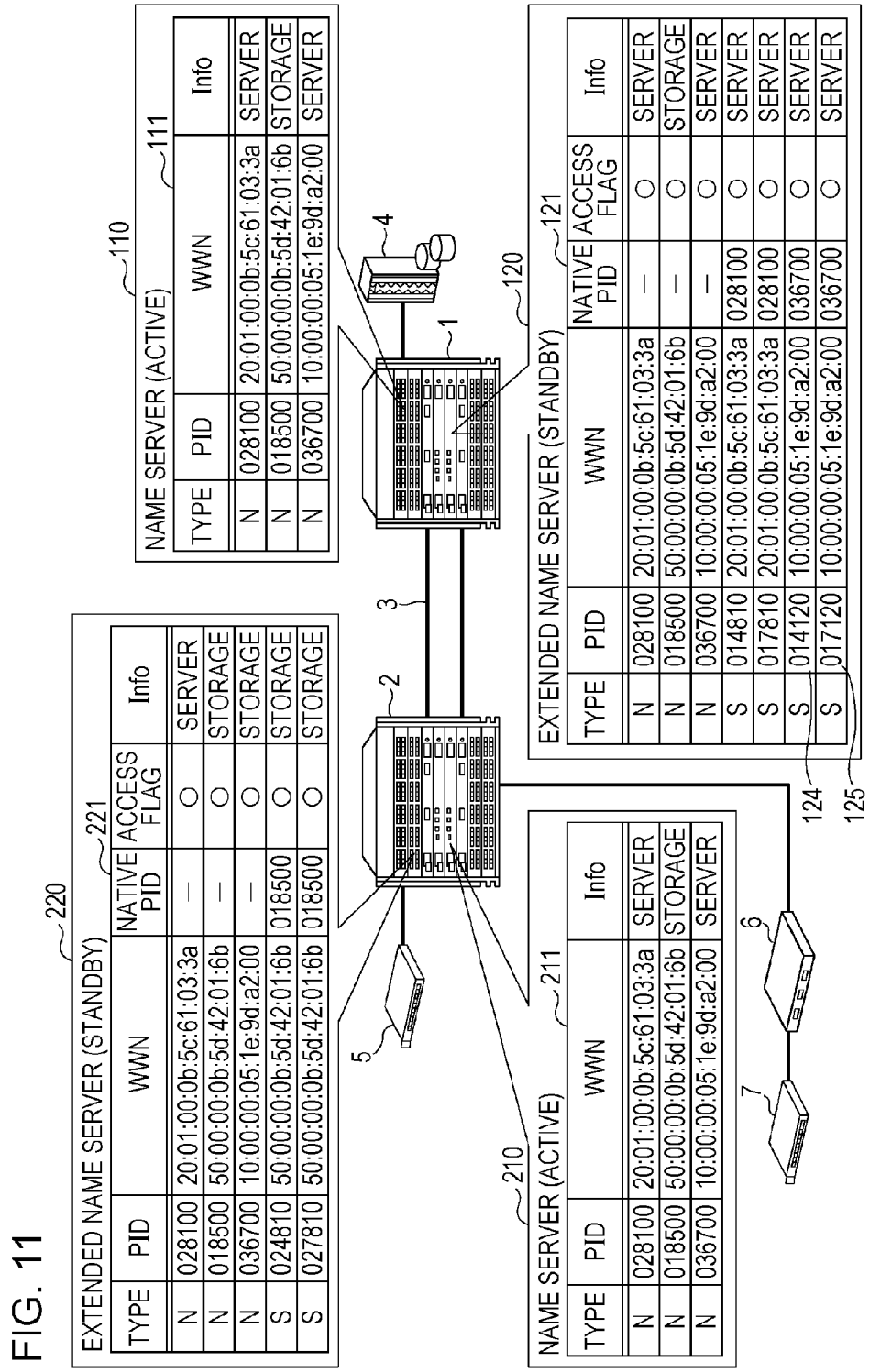
FIG. 11 illustrates the states of name servers and extended name servers in a second embodiment at normal times.

FIG. 11 illustrates the states of name servers and extended name servers in the second embodiment at normal times. As illustrated in FIG. 11, the transfer switch 6 is connected to the center switch 2. A server 7 is further connected to the transfer switch 6.

The center switch and the transfer switch connected to it exchange the contents of address tables stored in their name servers. Each switch that has exchanged the contents of address tables adds, to its address table, information stored in the name server in the other switch with which the contents of the address tables have been exchanged. The center switch 2 and transfer switch 6 are mutually connected as an example in this embodiment. In this embodiment, therefore, the center switch 2 acquires information stored in the name server in the transfer switch 6, that is, information about the server 7, and stores the information in the address table 211 in the name server 210. Conversely, the transfer switch 6 stores information stored in the name server 210 in the address table stored in the name server in the transfer switch 6.

Since the center switch 2 and center switch 1 exchange information in the address tables stored in their name servers, the center switch 1 also acquires information in the address table stored in the name server in the transfer switch 6. Thus, the name servers in the all center switches and the transfer switch in the storage system have the same contents.

This embodiment assumes that the WWN of the server 7 connected to the transfer switch 6 is 10:00:00:05:1e:9d:a2:00. In this case, the address table 111 in the name server 110 and the address table 211 in the name server 210 have the same contents, as illustrated in FIG. 11. Specifically, the address tables 111 and 211 include the PID, WWN, and Info of the storage unit 4, server 5, and server 7. The name server in the transfer switch 6 also has an address table having the same contents as the address tables 111 and 211.

In this embodiment, the extended address table 221 stored in the extended name server 220 includes two switching PIDs for the storage unit 4 connected to the center switch 1. The extended address table 121 stored in the extended name server 120 includes two switching PIDs for the server 5 connected to the center switch 2 and two switching PIDs for the server 7 connected to the center switch 2 through the transfer switch 6. PIDs 124 and 125 in FIG. 11 indicate the switching PIDs of the server 7, for example. Specifically, the PID 124 is a switching PID used to connect to the server 7 by using a route passing through the ICL 3 with port number 1 on the core blade inserted into the third slot. the PID 125 is a switching PID used to connect to the server 7 by using a route passing through the ICL 3 with port number 1 on the core blade inserted into the sixth slot. In the switching PID used to connect to the server 7, the port number of a port, on the center switch 2, to which the transfer switch 6 is connected is used as the port number of the port to which the server 7 is connected. The switching PID used to connect to the server 7 connected to the center switch 2 through the transfer switch 6 is an example of route information on a device connected to the adjacent connection control apparatus through another connection control apparatus.

Figure 12:
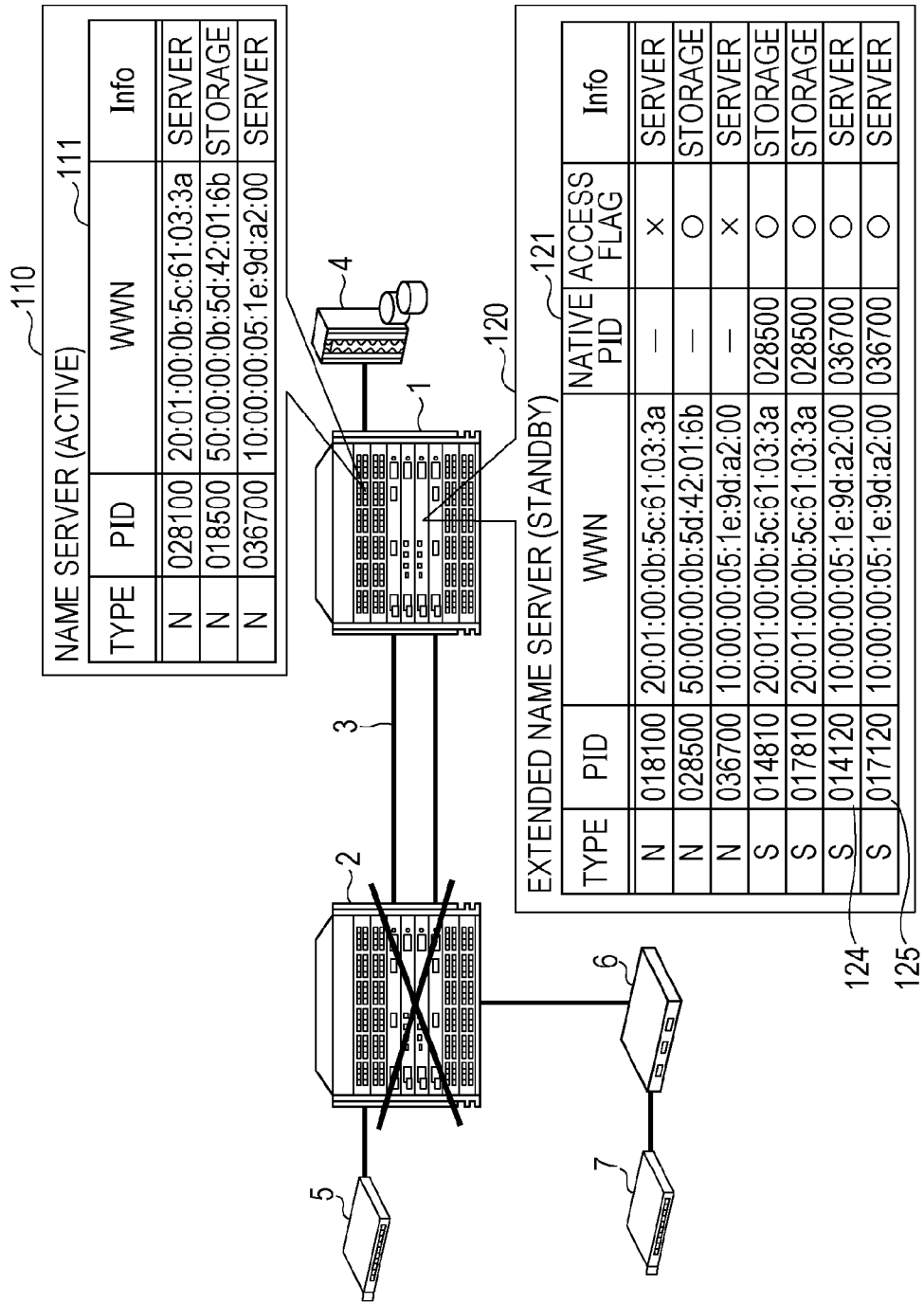
FIG. 12 illustrates a state in which one of center switches in the second embodiment goes down, and particularly illustrates the state of the expanded name server in another center switch.

FIG. 12 illustrates a state in which one of the center switches in the second embodiment goes down, and particularly illustrates the state of the expanded name server in the other center switch. A case in which the center switch 2 goes down in the state illustrated in FIG. 11 will be described with reference to FIG. 12.

When the center switch 2 goes down, the overall control unit 101 commands the overall control unit 102 to reflect information stored in the name server 210 in the center switch 2. The extended name server 120 in the overall control unit 102 indicates x in the access flag field, in the extended address table 121, corresponding to the device directly connected to the center switch 2 and the device connected to the center switch 2 through the transfer switch 6. In this example, x is indicated in the access flag field corresponding to two servers in the extended address table 121, as illustrated in FIG. 12.

If the overall control unit 102 receives a request to transfer FC data to the server 5 or 7 in this state, the overall control unit 102 acquires a switching PID, which indicates a transfer destination, from the extended name server 120. If the overall control unit 102 receives a request to transfer FC data to the server 7, for example, the overall control unit 102 acquires the PID 124 or 125 from the extended name server 120. The overall control unit 102 then notifies the routing control unit 103 of the PID 124 or 125, which is the acquired switching PID. The routing control unit 103 uses the switching PID, of which the routing control unit 103 has been notified, to send a FC frame to the relevant port, on the center switch 2, to which the transfer switch 6 is connected. The transfer switch 6 receives the FC frame from the port, on the center switch 2, indicated by the switching PID and transfers the received FC frame to the server 7, which is the destination indicated by the DID in the FC frame.

The FC frame is output from the device connected directly to the center switch 2 or connected through the transfer switch 6 to the center switch 2 and is transferred by the routing control unit 203 to the routing control unit 103 according to the prioritized port setting. The routing control unit 103 receives the FC frame and uses the PID specified by the extended name server 120 to transfer the FC frame.

As described above, even if a center switch goes down in a configuration in which the center switch and a device are mutually connected through a transfer switch, an FC frame may be transferred by an extended name server to the device connected to the center switch through the transfer switch.

How information is exchanged between name servers in center switches, each of which includes a transfer switch, when the center switch 2 goes down will be described with reference to FIG. 13. FIG. 13 is a sequence diagram of processing executed at a time when one center switch in the storage system in the second embodiment goes down. In FIG. 13, a transfer switch 8 is connected to the center switch 1 and a transfer switch 9 is connected to the center switch 2, these transfer switches being denoted SW.

The transfer switch 9 sends information stored in its name server to the port unit 205 (operation S501).

The port unit 205 receives the information in the name server from the transfer switch 9 and transfers the received information to the routing control unit 203 (operation S502).

The routing control unit 203 receives the information in the name server from the port unit 205 and transfers the received information to a prioritized port (operation S503). The information in the name server, which has been output from the transfer switch 9 in this way, is sent to the routing control unit 103 (operation S504).

Similarly, the transfer switch 8 sends information stored in its name server to the port unit 105 (operation S505).

The port unit 105 receives the information in the name server from the transfer switch 8 and transfers the received information to the routing control unit 103 (operation S506).

Since the center switch 2 is in a down state, the routing control unit 103 decides that the transfer destination of the information in the name server is the overall control unit 102 on the standby side (operation S507). The routing control unit 103 then sends the information in the name server to the overall control unit 102 (operation S508).

The overall control unit 102 receives the information in the name server and reflects the received information into the extended name server 120 in the overall control unit 102 (operation S509). That is, the extended name server 120 stores, in the extended address table 121, the received information in the name server. The overall control unit 102 transfers the received information in the name server to the overall control unit 101 (operation S510).

The overall control unit 101 receives the information in the name server and reflects the received information into the name server 110 in the overall control unit 101 (operation S511). That is, the name server 110 stores, in the address table 111, the received information in the name server.

Then, the overall control unit 101 starts processing to respond to the exchanging of the information in the name server. The overall control unit 101 first decides whether the transfer switch with which the information in the name server is to be exchanged is connected to the down center switch (operation S512).

If the information exchange destination is connected to the down center switch (the result in operation S512 is Yes), the overall control unit 101 inquires a transfer destination of the overall control unit 102. The overall control unit 102 receives the inquiry from the overall control unit 101 and inquires a switching PID, which is the PID of the transfer destination, of the extended name server 120 (operation S513). The overall control unit 102 then sends the transfer destination PID acquired from the extended name server 120 to the routing control unit 103.

If the information exchange destination is not connected to the down center switch (the result in operation S512 is No), the overall control unit 101 sends the transfer destination PID acquired from its name server 110 to the routing control unit 103. The routing control unit 103 receives the PID from the overall control unit 101 or 102 and decides whether the received PID is a switching PID (operation S514).

If the received PID is not a switching PID (the result in operation S514 is No), the routing control unit 103 sends a response to the port unit 105 connected to the device to which the PID of the transfer destination has been assigned (operation S515).

The port unit 105 receives the response from the routing control unit 103 and sends the received response to the transfer switch 8 (operation S516).

If the received PID is a switching PID (the result in operation S514 is Yes), the routing control unit 103 references the switching PID and determines a transfer port to which to transfer the FC frame (operation S517). The routing control unit 103 then sends the FC frame to the routing control unit 203 through the route indicated in the switching PID (operation S518).

The routing control unit 203 references the switching PID and transfers the response to the port unit 205, which is the destination specified in the switching PID, (operation S519). Accordingly, the response sent from the routing control unit 103 is transferred to the port unit 205 (operation S520).

The port unit 205 outputs a response from a port specified by the switching PID (operation S521).

If the destination of the response is the transfer switch 9, for example, the response sent from the routing control unit 103 is sent to the transfer switch 9 because the transfer switch 9 is connected to the port specified by the switching PID (operation S522).

As described above, the fiber channel switch, which is the center switch in this embodiment, may continue communication with a device connected to a center switch, which is connected to the fiber channel switch, through a switch that simply performs routing if the center switch causes failures in both the active side and the standby side and thereby goes down. That is, even in a storage system having a very large structure in which, for example, a switch is connected to a center switch and a device is further connected to the switch, if the center switch causes failures in both the active side and the standby side and thereby goes down, communication may be continued.

In the above example, a case in which two center switches are used have been described. Even if N center switches are used, however, when they are connected in, for example, a star, they may operate. That is, even in a storage system in which N center switches are placed as described above, communication may be continued if a center switch causes failures in both the active side and the standby side and thereby goes down.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A connection control apparatus comprising:
   an active control unit that performs routing of data to a first device connected to a port of the connection control apparatus by using an address of the first device; and
   a standby control unit that, when the active control unit causes a failure, performs routing of data to the first device by using the address of the first device and by using route information indicating a connection route to a second device connected to a port of an adjacent connection control apparatus connected to the connection control apparatus, the standby control unit performing routing of data to the second device by using the route information upon the adjacent connection control apparatus being unable to perform routing, wherein
   the active control unit assigns the address of the first device and creates a first table by using the assigned address of the first device, and
   the standby control unit
      acquires an address assigned to the second device by the adjacent connection control apparatus and creates a second table by using the address assigned by the active control unit and the address acquired from the adjacent connection control apparatus,
      creates route information in correspondence to the address of the second device, the address of the second device being acquired from the adjacent connection control apparatus, the route information indicating a connection route from the connection control apparatus to the port, of the adjacent connection control apparatus, to which the second device is connected,
      stores the route information in the second table in correspondence to the address of the second device acquired from the adjacent connection control apparatus, and
      performs routing of data by acquiring the route information corresponding to the address of the second device from the second table and by transferring data to the port to which the second device is connected using the connection route indicated in the acquired route information, when the adjacent connection control apparatus is unable to perform routing and routing of data to the second device is requested.

2. The connection control apparatus according to claim 1, wherein the standby control unit
   acquires from adjacent connection control apparatus an address of a third device connected to the adjacent connection control apparatus through another connection control apparatus, and
   creates route information for the third device in correspondence to the address of the third device, the route information indicating a connection route from the connection control apparatus to the port, of the adjacent connection control apparatus, to which the other connection control apparatus is connected.

3. A connection control apparatus comprising:
   one or more processors configured to:
   perform primary routing of data to a first device connected to a port of the connection control apparatus by using an address of the first device;
   when the primary routing of data causes a failure, perform routing of data to the first device by using the address of the first device and by using route information indicating a connection route to a second device connected to a port of an adjacent connection control apparatus connected to the connection control apparatus, performing routing of data to the second device by using the route information upon the adjacent connection control apparatus being unable to perform routing;
   assign the address of the first device and create a first table by using the assigned address of the first device;
   acquire an address assigned to the second device by the adjacent connection control apparatus and create a second table by using the assigned address and the address acquired from the adjacent connection control apparatus;
   create route information in correspondence to the address of the second device, the address of the second device being acquired from the adjacent connection control apparatus, the route information indicating a connection route from the connection control apparatus to the port, of the adjacent connection control apparatus, to which the second device is connected;
   store the route information in the second table in correspondence to the address of the second device acquired from the adjacent connection control apparatus; and
   perform routing of data by acquiring the route information corresponding to the address of the second device from the second table and by transferring data to the port to which the second device is connected using the connection route indicated in the acquired route information, when the adjacent connection control apparatus is unable to perform routing and routing of data to the second device is requested.

* * * * *